United States Patent [19]
Mismas

[11] Patent Number: 5,730,174
[45] Date of Patent: Mar. 24, 1998

[54] SOLENOID VALVE CARTRIDGE FOR LUBRICATION DIVIDER VALVES

[75] Inventor: James R. Mismas, Concord Township, Ohio

[73] Assignee: Lubriquip, Inc., Cleveland, Ohio

[21] Appl. No.: 673,150

[22] Filed: Jul. 1, 1996

[51] Int. Cl.[6] .......................... F15B 15/044; F16N 25/02
[52] U.S. Cl. ............................ 137/269; 137/271; 251/367
[58] Field of Search ............................ 137/269, 271; 251/367, 366

[56] References Cited

U.S. PATENT DOCUMENTS

| | | |
|---|---|---|
| 1,938,758 | 12/1933 | Ernst . |
| 2,019,299 | 10/1935 | Fox et al. . |
| 2,499,571 | 3/1950 | Davis . |
| 3,993,091 | 11/1976 | Loveless ............................ 137/269 |
| 4,078,574 | 3/1978 | Kosarzecki ........................ 137/269 |
| 4,079,864 | 3/1978 | Cox . |
| 4,312,425 | 1/1982 | Snow et al. . |
| 4,390,083 | 6/1983 | Saretzky . |
| 4,392,551 | 7/1983 | Buryakov et al. . |
| 4,572,331 | 2/1986 | Powell et al. . |
| 5,197,568 | 3/1993 | Horttonen . |
| 5,219,040 | 6/1993 | Meuer et al. . |
| 5,291,915 | 3/1994 | Lukasczyk et al. ............ 137/269 X |
| 5,480,004 | 1/1996 | Snow . |

*Primary Examiner*—Kevin Lee
*Attorney, Agent, or Firm*—Hill, Steadman & Simpson

[57] ABSTRACT

A progressive distributor valve including a plurality of spool blocks each of which is mounted on a spool base block, the spool blocks having reciprocating spools therein for distributing lube oil into respective spool base blocks, and a shut off valve base block mounted to an adjacent spool base block and having a comparable size thereto, the valve base having an inlet for receiving lubricant and an outlet connected to an adjacent spool base block. The inlet of the valve base is connected to a source of lube oil. A valve block is mounted onto the valve base block and having a valve inlet flow connected to the inlet of said valve base block and an outlet flow connected to the outlet of the valve base block, and a flow channel and valve seat between the valve block inlet and outlet. A valve element is arranged to interfit into said flow path at the valve seat to close said flow path, and a solenoid actuator removes the valve element from the valve seat to allow flow through the valve block and valve base into the adjacent spool base block. The valve seat and valve element can be installed as a cartridge.

13 Claims, 6 Drawing Sheets

SOLENOID VALVE CARTRIDGE FOR LUBRICATION DIVIDER VALVES

BACKGROUND OF THE INVENTION

The present invention relates to lubrication progressive divider valves and in particular to a series progressive divider valve having a plurality of valve modules each serving a lubrication user and connected in stacked series fashion and provided with a solenoid shut off valve to close the lube oil inlet to the valve.

Lubrication progressive divider valves are hydraulically controlled lube oil distributors for injecting small amounts of lubrication sequentially to plural lubrication destinations such as parts to a single machine or multiple machines. A lubrication distributor valve is disclosed for example in U.S. Pat. Nos. 4,312,425; 5,480,004; and 4,572,331. According to the embodiments disclosed in these patents, a modular design is employed for manufacturing and installation flexibility to provide delivered lubrication for multiple users wherein the number of users can be changed easily by adding or subtracting valve modules. Each valve module is separated into a spool base block and a spool block, connected by bolts. The modules are connected in series with end modules being specialized. At one end is an inlet module and at the other end is a closure module.

In extended lubrication systems having varied lube frequencies, such as automotive transfer lines, conveyor lines, flexible machining centers, or complete plant lubrication systems, each zone of lubrication is provided with divider valves with a solenoid inlet shutoff valve to the divider valve. The shut off valve is a normally closed valve. As the solenoid coil is energized, the shut off valve is opened allowing lubricant to flow through. Once the proper amount of lubricant has flowed through, the shut off valve is de-energized, shutting off lubricant flow to that distributor valve. This system allows for individual zone lubrication and prevents over-lubrication, thus saving on lubrication costs.

In operation, each solenoid shutoff valve is used in conjunction with an oil header line loop system with each shutoff valve representing a zone of lubrication. The header line can either be continuously or intermittently pressurized upon demand. When a particular machine zone requires lubrication, based upon a predetermined interval, an electrical signal from a controller will sequentially energize the solenoids attached to the shutoff valves. This will open the particular shut off valve and allow lubricant from the header line to proceed through the particular divider valve, thus providing lubricant to the points within the particular zone. Once the zone has received the proper amount of lubrication, determined through monitoring a cycle switch or proximity switch for an appropriate number of cycles, the controller will de-energize the solenoid and the valve will shut-off the lubricant to that zone.

One drawback from the prior known devices is that any failure of the solenoid component required complete disassembly of the series progressive divider valve to remove the inlet section to service the solenoid valve. Additionally, if an attempt is made to repair the solenoid component, the service was performed at the machine, making the repair extremely difficult and time consuming. By attempting the repair at the machine, including disassembling the divider valve, the integrity of the lubrication system is violated, and the system would then require a complete servicing.

SUMMARY OF THE INVENTION

It is an object of the present invention to provide a shutoff valve for a progressive divider valve which simplifies repair and adds new features. It is an object of the invention to provide a solenoid shutoff valve having replaceable components assembled into a valve block. It is an object of the invention to assemble the solenoid shut off valve components including valve and valve seat into a unitary cartridge for the cartridge to be installed into the block in a simple operation, or to provide the valve seat as part of the block.

It is an object of the invention to provide a solenoid cartridge with a manual override. This feature is advantageous for trouble shooting. A lubrication zone can be actuated without electric power connected or having to receive a command signal from the main control unit (PLC or computer).

An object of the present invention is to make the solenoid shutoff valve a valve block component mounted to a valve base block so that the configuration can be changed and repaired after the system is installed without complete disassembly.

The object of the invention are achieved in that a solenoid shut-off valve is provided which is modular in construction. The shut-off valve is mounted in series with a plurality of valve modules which constitute the progressive divider valve. The solenoid shut off valve provides a special valve base block which is identical in length and height as base blocks used for the valve modules, and particularly can also have the same width. A valve block is then mounted on top of this special base block. The solenoid valve components can be assembled into a cartridge and then the cartridge can be installed into the valve block. A manual override can be provided to adjust the solenoid shut off valve without requiring a command signal from the main control unit and without electrical power. To service, the valve block can be removed and immediately replaced with a new valve block and service can be performed at the shop (offline). The base blocks for the valve modules and the valve base block for the shut off valve can be assembled when the system is being designed and the solenoid actuator valve block can be added at a later time with the simple removal of a bypass plate. The entire divider valve can be easily bled through a standard inlet section.

The modular concept reduces the present package length and reduces the number of external leakage points that are inherent with externally plumbed components.

3

Figure 5:
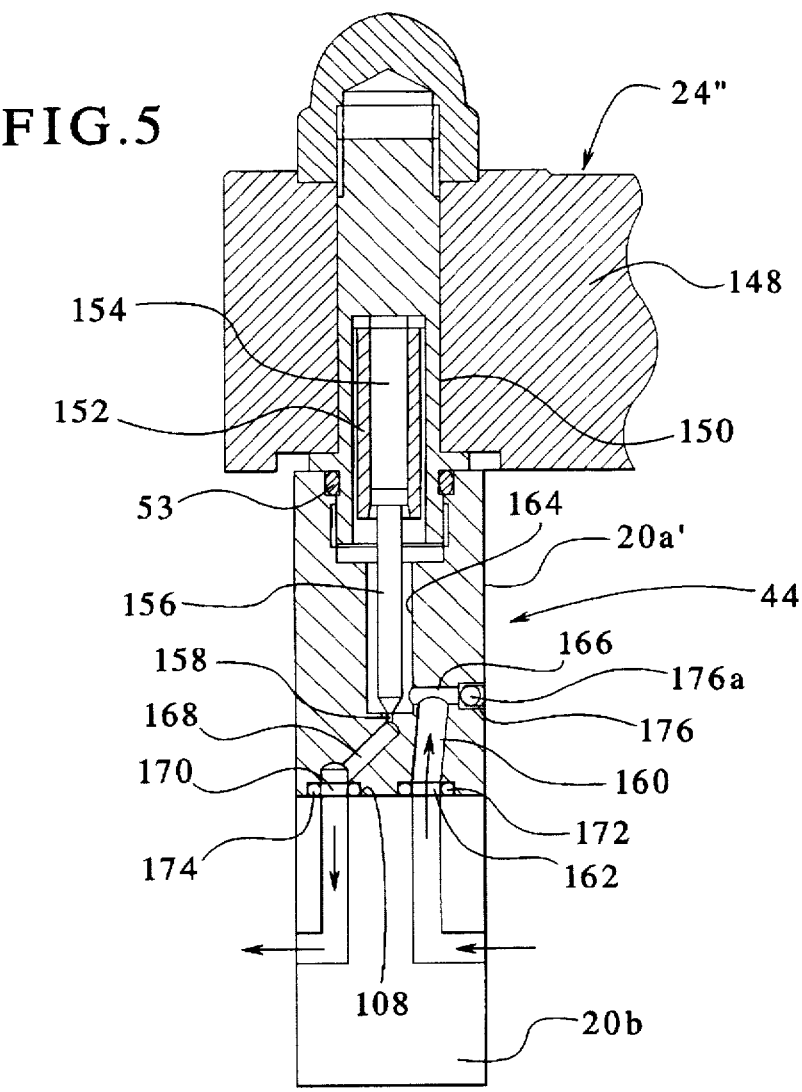
FIG. 5 is a third shut off valve embodiment taken generally along III—III of FIG. 2.
Figure 10:
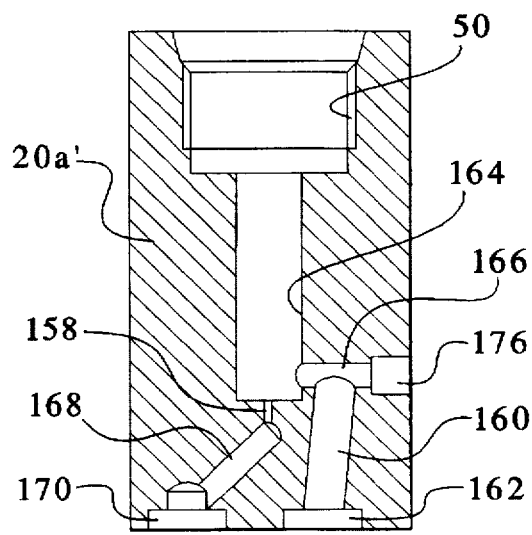
Figure 11:
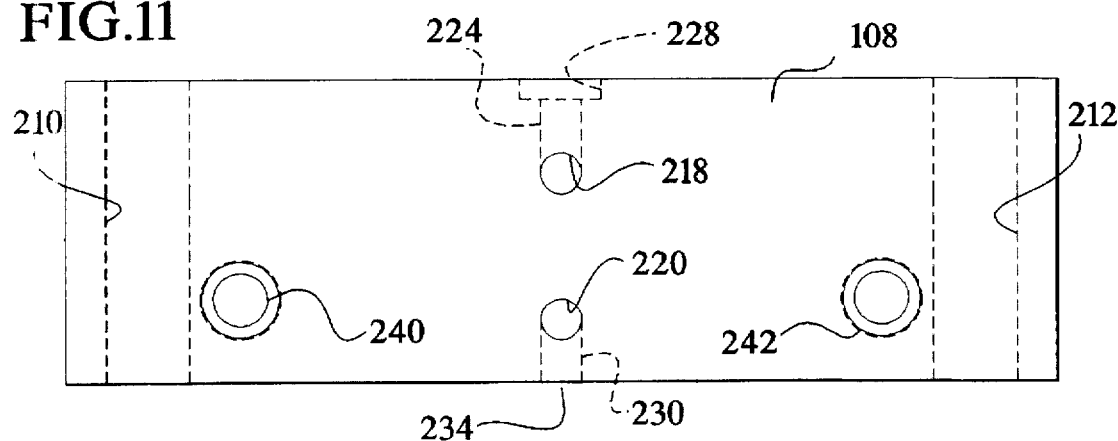
Figure 12:
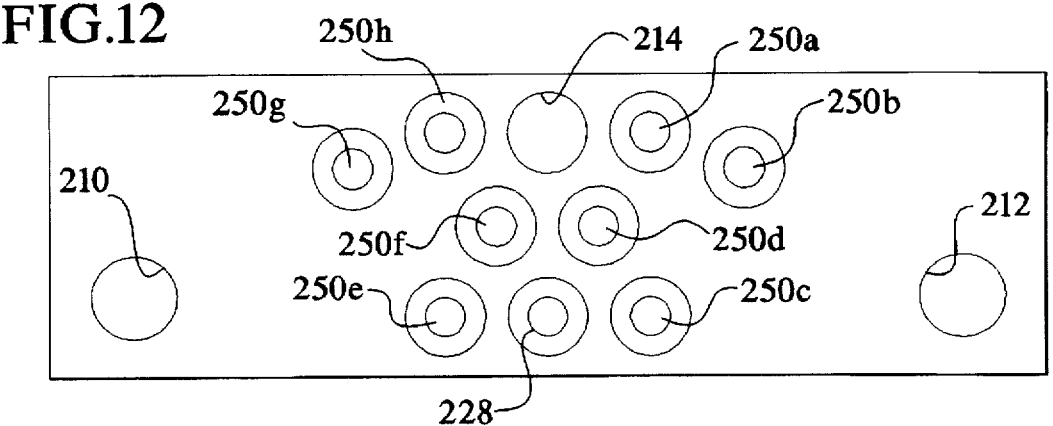
Figure 13:
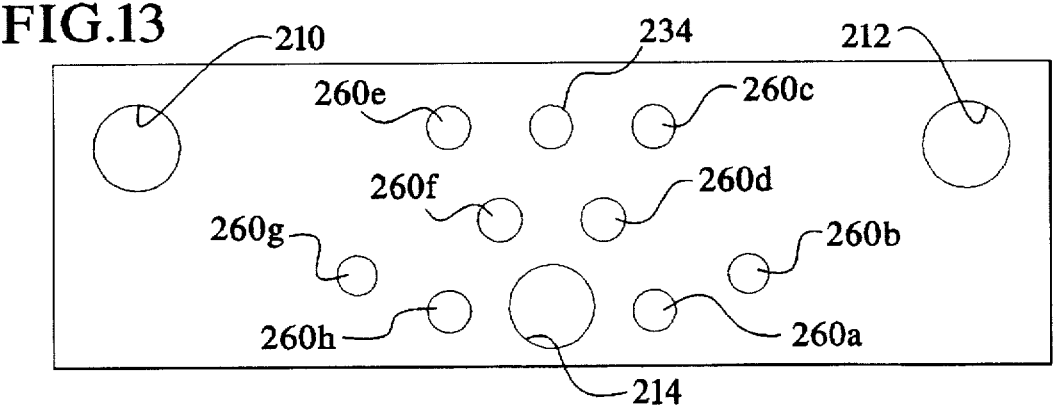

FIG. 10 is a sectional view of a valve block corresponding to the third embodiment shown in FIG. 5;

FIG. 11 is a top plan view of a valve base block of the valve block assembly of FIGS. 1–10;

FIG. 12 is a back side elevational view of the valve base block shown in FIG. 11; and FIG. 13 is a front elevational view of the valve base block shown in FIG. 11.

DETAILED DESCRIPTION OF THE PREFERRED EMBODIMENTS

Figure 1:
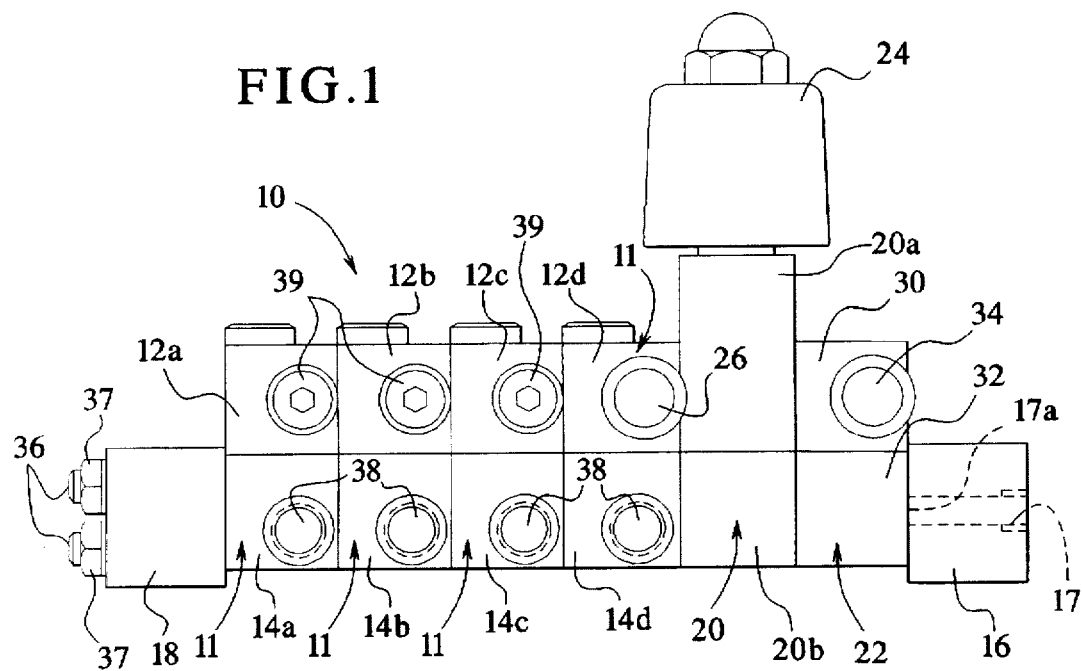
FIG. 1 is an elevational view of a distributor valve including the present invention shut off valve assembly.
Figure 2:
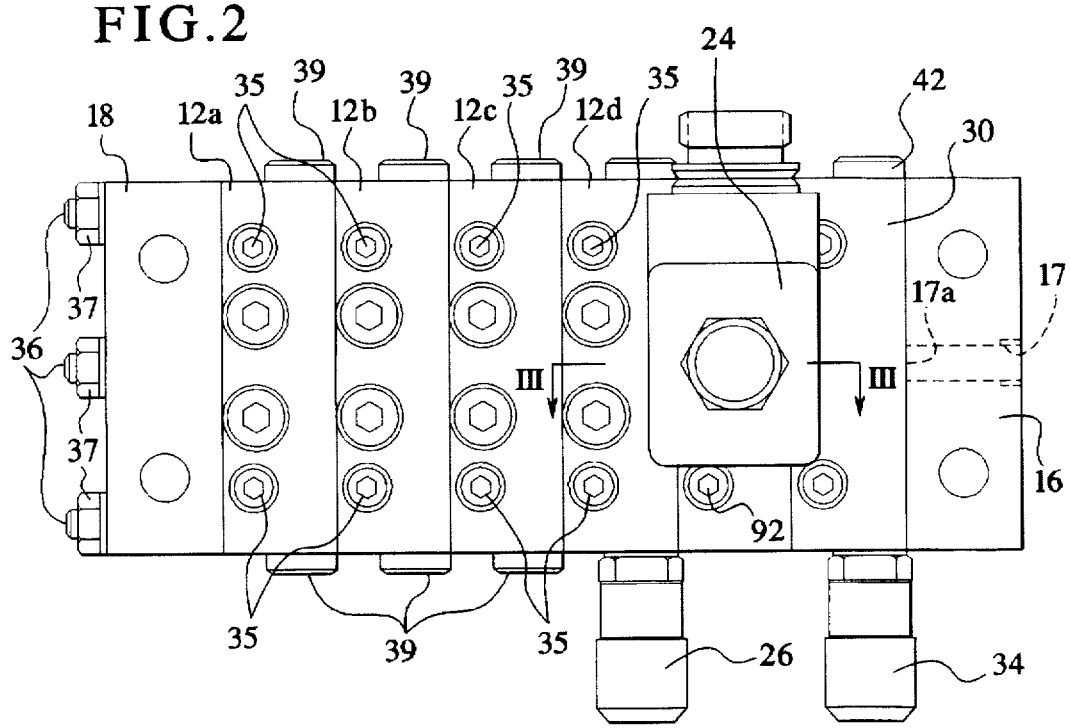
FIG. 2 is a top plan view of the distributor valve shown in FIG. 1.

FIG. 1 illustrates a divider valve assembly 10 having valve modules 11 having spool blocks 12a, 12b, 12c, 12d mounted respectively to spool base blocks 14a, 14b, 14c, 14d. The spool blocks and spool base blocks communicate to each other through vertical channels and to adjacent base blocks in series as described in for example U.S. Pat. Nos. 4,312,425; 5,480,004; and 4,572,331. An inlet section 16 having an inlet port 17, and a closure section 18 are arranged on opposite ends of the spool base blocks 14a–14d. Between the inlet section 16 and the spool block 12d together with the base block 14d is a shut off valve module 20 and a filter assembly 22. The shut off block assembly 20 uses a solenoid actuator 24. The shut off valve 20 comprises a shut off valve block 20a fastened onto a valve base block 20b.

An indicator instrument 26 is provided in at least one of the spool blocks, in this case spool block 12d. This indicator instrument 26 senses movement of a reciprocating distributor spool (not shown) within the spool block 12d to monitor proper reciprocating operation.

The filter assembly 22 comprises a filter block 30 mounted onto a filter base block 32. The filter block 30 and the filter base block 32 approximate the size of the spool blocks 12a–12d and the spool base blocks 14a–14d. This is advantageous for tooling and configuration compatibility.

Mounted at one end of the filter block 30 is a indicator instrument 34 for indicating the condition of a filter element inside the filter block 30.

The spool base blocks 14a–14d and the spool blocks 12a–12d of each valve module 11 are held together by bolts 35. The inlet section 16 and the closure section 18, with the valve modules 11, filter assembly 22 and shut off valve module 20 between, are held together by threaded rods or bolts 36. Each bolt extends through each of the closure section 18, shut off valve module 20, filter assembly 22, base blocks 14a–14d, and into the inlet section 16. The bolts are either threaded into the inlet section 16 or otherwise secured therein, such as by cap screw heads, and fastened by nuts 37 at the closure section 18. The bolts 36 are received within and through bores of each of the elements which are all in registry.

The divider valve assembly 10 of FIG. 1 is a completely modular assembly with each of the inlet section 16, end section 18, valve modules 11, filter assembly 22, shut off valve module 20 being removable separately. Additionally, the spool blocks 12a–12d and spool base blocks 14a–14d are separable for service by unfastening the bolts 35. Also, a filter element is separable from the filter block 30 and filter base block 32. Each spool block has a bore extending the entire width thereof, in which a valve spool (not shown) is disposed and is movable by hydraulic actuation to selectively distribute lubricant in a sequence via an output port 38 in each of the spool base blocks 14a–14d. After the spools are placed in the spool blocks 12a–12d, the opening of the bores are closed by a threaded plug 39, to create a chamber for lateral sliding of the spools.

4

Each of the valve modules formed by base block and spool block is substantially identical. Each base block and spool block has a plurality of vertical non-communicating passages therein (not shown), which are in registry when the spool block is fastened down onto the base block. Dependent on the position of the spool within the bore as a result of hydraulic actuation, one or more of these passages is placed in fluid communication with a passage extending the length of the distributor valve assembly 10, which is, in turn, in fluid communication with the inlet port 17. Lubricant entering the valve assembly via the inlet port 17 is thereby directed in a sequence out of each output port 38, dependent on the respective positions of the spool in the bores of each spool block 12a–12d.

Figure 3:
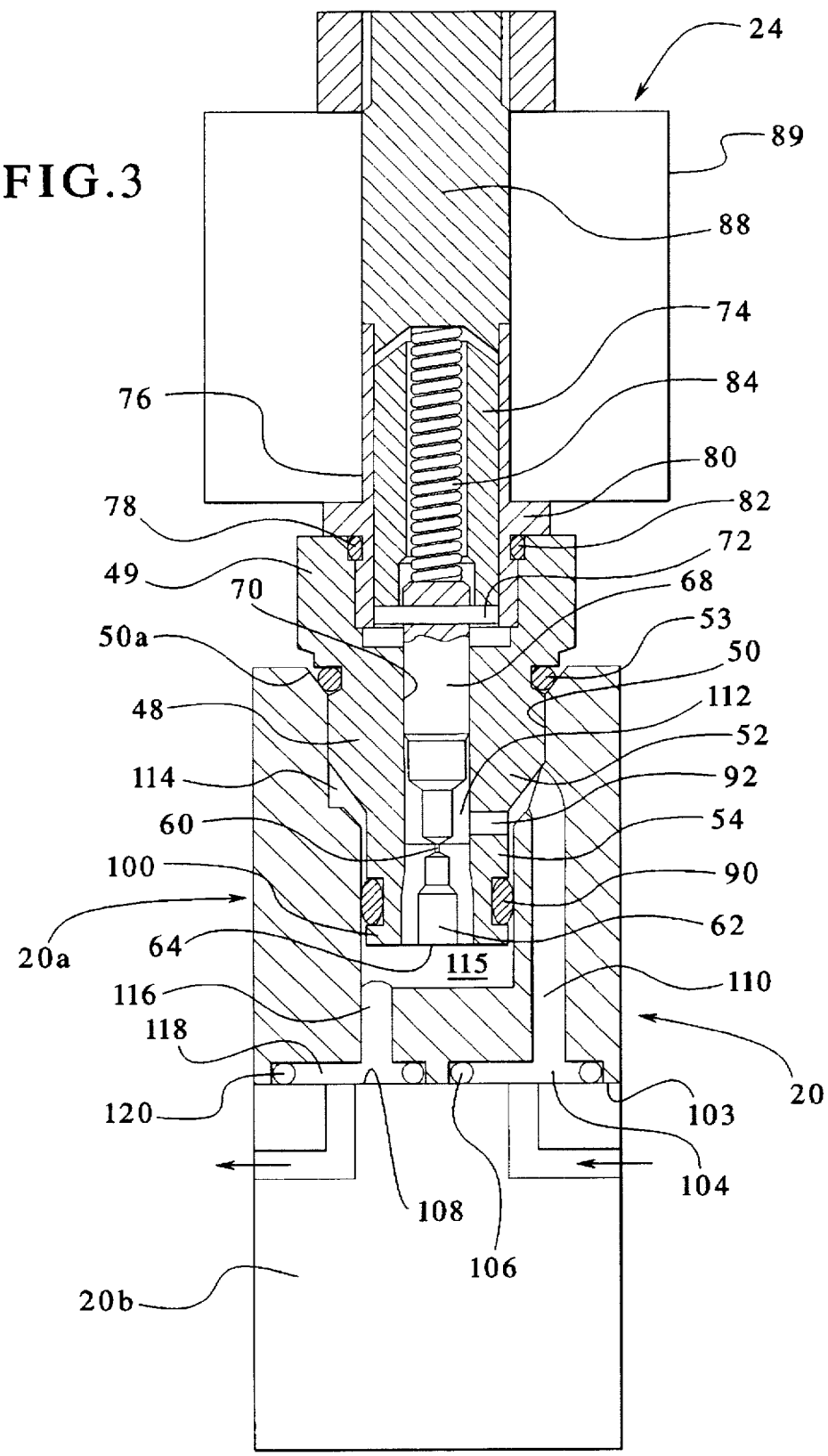
FIG. 3 is a sectional view of a first embodiment of a shut off valve assembly taken generally along line III—III of FIG. 2.

FIG. 3 shows the solenoid actuator 24 having a plug member 48 screwed into the shut off valve block 20a by a hexagonal nut 49. The valve block 20a is fastened onto the valve base block 20b. The valve base block 20b is more fully described in FIGS. 11–13. The valve block 20a is also described in FIG. 9. The shut off valve block 20a includes a threaded bore 50 for receiving a threaded neck 52 of the solenoid actuator 24. The threaded neck 52 squeezes an O-ring 53 against a bevelled opening 50a of the bore 50 for sealing thereto. The threaded neck 52 extends into an extension neck 54 wherein is housed a valve seat 60 open to an axial passage 62 which has an open end 64. A needle valve 68 is held axially within a central bore 70 of the plug member 48. The needle valve is held by a pin 72 to a cylindrical ferromagnetic plunger 74. The plunger 74 can reciprocate within a sleeve 76 which by way of external threads is screwed into an open bore 78 of the plug member 48. A collar 80 of the sleeve compresses an O-ring seal 82 to seal the plug member to the sleeve. Within the magnetic cylinder is arranged a spring 84 which normally biases the needle valve 68 downward to seal against the valve seat 60. The spring presses against a solenoid stop 88 which is held stationary with respect to the sleeve 76. A coil 89 (shown schematically as a box) surrounds the stop 88 and plunger 74. When the coil 89 is energized electrically, magnetic force pulls the plunger 74 upwardly toward the stop 88 against the urging of the spring 84 to lift the needle valve 68 by way of the pin 72 to open the valve seat 60. The extension neck 54 of the plug member 48 further includes an O-ring seal 90 and a radial passage 92 in communication with the valve seat 60 when opened, free of the needle valve 68.

The shut off valve block 20a further includes a center bore 100 for housing the extension neck 54 and seal thereto by the O-ring 90. At a bottom surface 103, a countersunk inlet 104 holds an O-ring 106 to seal against a top surface 108 of the base block 20b. Lubricant received from the base block into the countersunk inlet 104 moves through the inlet passage 110 arranged vertically and in communication with an inlet chamber 112 through an annular chamber 114 and the passage 92. The inlet chamber 112 is openable into the open end 64 through the seat 60.

The open end 64 is open into an outlet chamber 115 which is open into a vertical outlet passage 116 formed in the shut off valve block 20a. The outlet passage 116 is open into a countersunk outlet 118 sealed to the surface 108 of the valve base block 20b by an O-ring 120. As evident from FIG. 3, if the solenoid actuator 24 malfunctions, the entire unit can be unscrewed from the shut off valve block 20a for repair.

Figure 4:
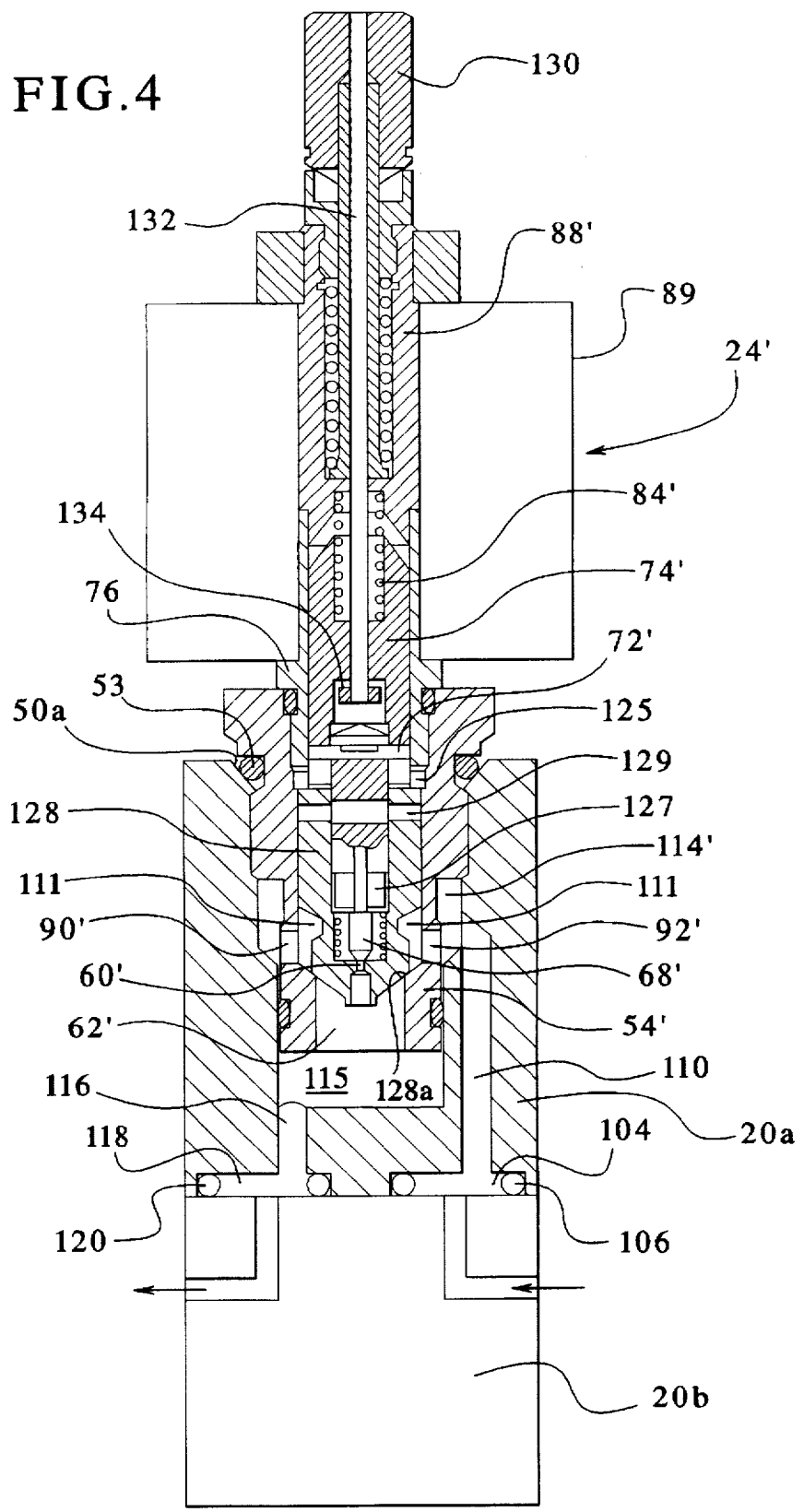
FIG. 4 is a second embodiment of a shut off valve assembly taken generally along line III—III of FIG. 2.

FIG. 4 illustrates an alternate embodiment solenoid valve, a pilot operated actuator 24' where like parts are indicated with like reference numerals. The actuator 24' in FIG. 4 is equipped with a manual override. A modified needle valve 68' connected to a pilot 127 is seated on a pilot valve seat 60' of a poppet 128 to close the passage 62' from the chamber 112. Lubricant under pressure flows from the passage 114' through the radial passages 92' into the annular chamber 111, into the chamber 112 through a passage (not shown) past the pilot 127 through passages 129 and into an annular area 125, causing a downward closing force on the poppet 128. This closing force balances an upward force on the poppet caused by lube pressure in the chamber 111. The needle valve 68' can be lifted from the seat 60' by the coil 89 to allow pressure flow through a passage 129 which is through a side wall of the poppet 128, from the annular area 125 to unbalance the upward pressure on the poppet 128 to overcome closing force of a spring 84' to open the poppet 128. The popper 128 can then be lifted from a valve seat 128a by pressure in the chamber 111 to provide a greater passage between an extension neck 54' and the poppet 128 for lubricant to flow through a passage therebetween to area 62'. From there lubricant flows into the outlet chamber 115 and thereafter out the vertical outlet passage 116 to the valve base block 20b.

The sleeve 76 holds the plunger 74' therein. The plunger is held adjacent a solenoid stop 88' held stationary with respect to the sleeve 76. Upon electric actuation of the coil 89, magnetic force pulls the plunger 74' upwardly against the urging of the spring 84' to relieve the balance back pressure in the annular area 125 through passages (not shown) to the radial passages 129 to easily lift the popper 128.

A manual actuator handle 130 can also be actuated to lift the plunger 74' by way of a rod 32 having an expanded end 134 and which pierces the plunger 74' axially. As with the embodiment of FIG. 3, the embodiment of FIG. 4 provides a self-contained solenoid actuator 24' which can be removed from the shut off valve block 20a for repair.

FIG. 5 shows an alternate embodiment of a solenoid actuator 24" having a solenoid coil 48 wherein is held a solenoid stop 150. A ferromagnetic sleeve pusher 152 interfits within the solenoid stop 150 to reciprocate vertically therein under magnetic influence of the solenoid coil 148. A spring 154 biases a needle valve 156 downwardly from the solenoid stop 150. The needle valve 156 closes a valve seat 158 formed into a valve base block 20a'. In this embodiment, an obliquely rising inlet passage 160 rises from a countersunk inlet 162 to the valve seat 158 via a lateral passage 166. A vertical center bore 164 wherein is held the needle valve 156 connects the valve seat 158 to the lateral passage 166. The lateral passage 166 is open into an obliquely descending outlet passage 168 terminating in a countersunk outlet 170. Both the countersunk inlet 162 and the countersunk outlet 170 are sealed by O-ring seals 172, 174 respectively to the top surface 108 of the base block 20b. A side outlet 176 with a ball check valve 176a is provided open to the lateral passage 166 for venting and purging. The valve block 20a' also described in FIG. 10.

Figure 6:
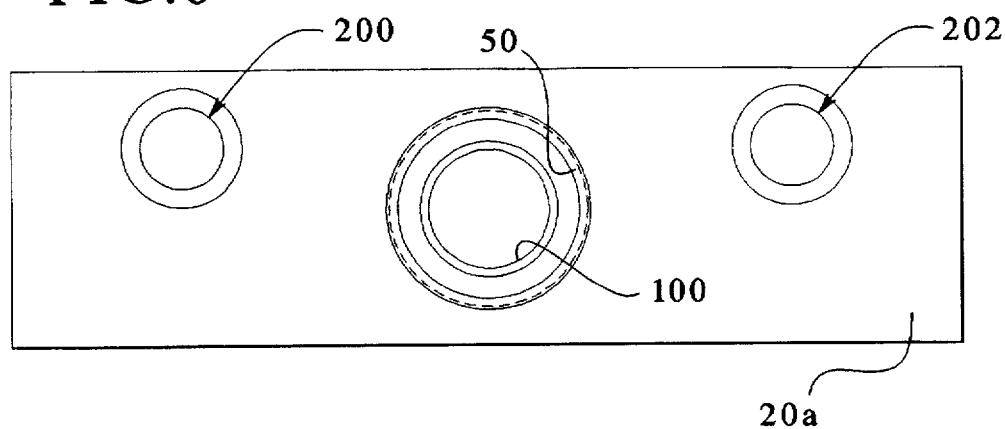
FIG. 6 is a top plan view of a shut off valve block of the present invention.
Figure 7:
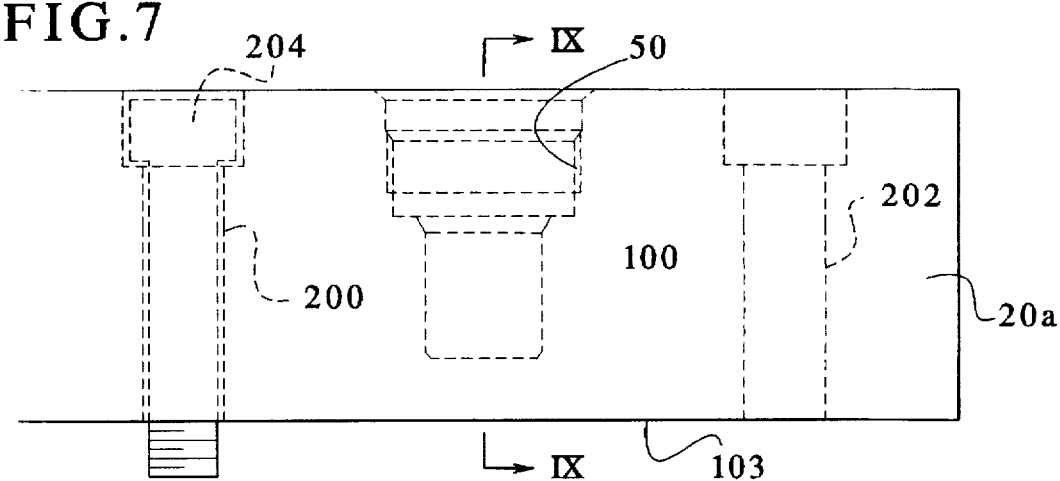
FIG. 7 is a side elevational view of the shut off valve block of FIG. 6.
Figure 8:
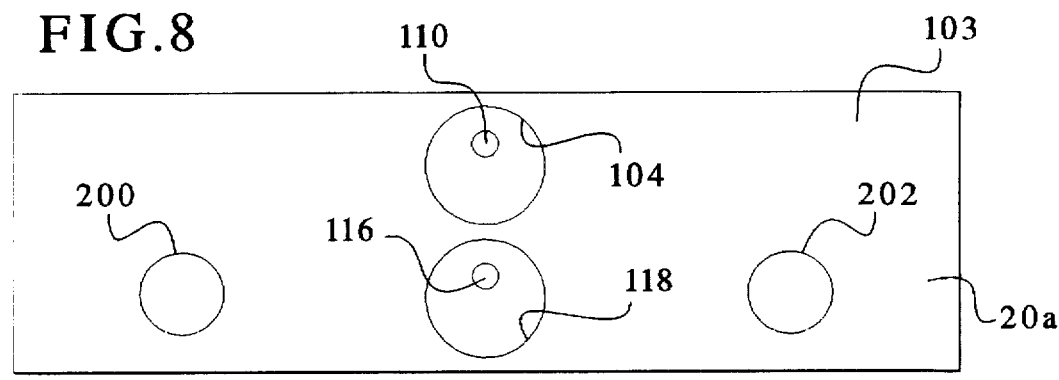
FIG. 8 is a bottom view of the shut off valve block of FIG. 6.
Figure 9:
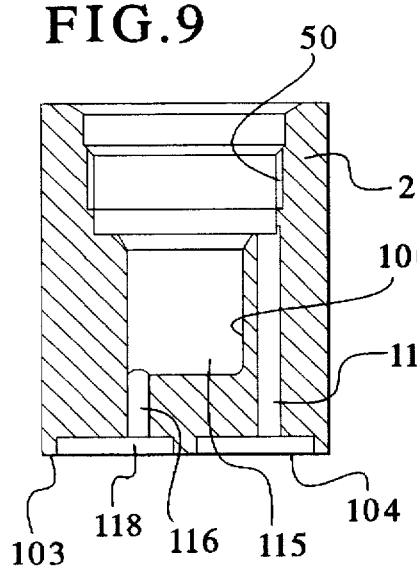
FIG. 9 is a sectional view of a valve block of the first and second embodiment shut off valve assemblies, taken generally along line IX—IX of FIG. 7.

FIG. 6-8 illustrate the structure of the shut off valve block 20a in more detail. The block includes two countersunk vertical bores 200, 202 respectively for receipt of cap screws 204, one of which is shown dashed in FIG. 7. The cap screws 204 connect the shut off valve block 20a onto the base block 20b. The valve shut off block 20a is connected to the distributor valve 10 via the valve base block 20b, such that the valve base block can be installed in the distributor block assembly and the valve shut off block 20a can be installed separately therefrom or removed for repair or replacement.

FIGS. 11-13 illustrate in isolation the shut off valve base block 20b having bores 210, 212, 214 for receiving the bolts or threaded rods 36 for assembling the shut off valve module 20 into the distributor valve 10. On the top surface 108 is located a lubricant delivery port 218 which delivers lubricant to the inlet 104 of the shut off valve block 20a, or alternately to the inlet 162 of the valve block 20a', when the shut off valve block bottom surface 103 is flushly mated to the base block top surface 108. Also, a lubricant receiving port 220 is arranged to register with the lubricant outlet 118, or alternately to the lubricant outlet 170 of the valve block 20a', on the surface 103. The lubricant delivery port 218 is connected by a first L-shape channel 224 to a lubricant inlet 228. The lubricant inlet 228 is provided with a socket for receiving an O-ring or resilient grommet to seal against an outlet port of the adjacent block for example the filter block 22 or an inlet section 16 (shown in FIGS. 1 and 2).

The receiving port 220 is connected by a second L-shaped channel 230 to a lubrication outlet 234 which communicates lubricant to an adjacent base block.

Bolt bores 240, 242 are shown which are threaded to receive the cap screws 204 to fasten the shut off valve block 20a, or alternately 20a', to the valve base block 20b at flush surfaces 103, 108. Seal O-rings or resilient grommets can be used to seal all registering ports which channel lubricant.

A number of additional ports 250a–250h are shown in FIG. 12 which are connected by straight through bores to further ports 260a–260h respectively on an opposite side of the block shown in FIG. 13. The additional ports 250a–250h are provided with sockets for receiving O-ring seals. The channels defined between the additional ports 250a–250h and further ports 260a–260h are provided for lubricant distribution in base blocks throughout the distributor valve, and longitudinal channels can be combined or modified by cross porting. A more detailed description can be found in U.S. Pat. Nos. 4,312,425; 5,480,004; and 4,572,331; herein incorporated by reference.

To increase similarity of ports for manufacturing economy and inventory reduction, it is advantageous that the filter base block 32 is an identical part to the shut off valve base block 20b and that both are identically sized in outside dimensions to individual spool blocks 14a, 14b, 14c, 14d.

Although the present invention has been described with reference to a specific embodiment, those of skill in the art will recognize that changes may be made thereto without departing from the scope and spirit of the invention as set forth in the appended claims.

I claim as my invention:

1. A progressive distributor valve including a plurality of spool blocks each of which is mounted on a spool base block, and having a reciprocating spool therein for distributing lube oil into a base block, the spool base blocks flow connected to lubricant users, comprising:

a valve base block mounted to an adjacent spool base block, said valve base block having an inlet for receiving lubricant and an outlet connectable to said adjacent spool base block, and a first channel between said inlet and a first opening at a face of said valve base block, and a second channel between said outlet and a second opening at said face of said valve base block;

a valve block mounted onto said valve base block, having a valve inlet connected to said first opening of said valve base block and a valve outlet connected to said second opening of said valve base block, and a flow path between said valve inlet and outlet including a valve seat, and a valve element arranged to interfit into said flow path to close said flow path at said valve seat; and a solenoid actuator operatively connected to said valve element for removing said valve element from said valve seat to allow flow therethrough.

2. The distributor valve according to claim 1, wherein said valve element is removable from said valve block through a screwed connection at a top of said valve block.

3. The distributor valve according to claim 1, wherein said valve block is bolted to said valve base block, and said valve base block is bolted to an adjacent spool base block.

4. The distributor valve according to claim 1, wherein said valve seat, valve element and said solenoid actuator are included in a cartridge which is removable from said valve block.

5. The distributor valve according to claim 1, wherein said valve base block has outside dimensions equal to one of said spool base blocks.

6. A shut off valve for a progressive distributor valve including a plurality of spool blocks each of which is mounted on a spool base block, the spool blocks having reciprocating spools therein for distributing lube oil into respective spool base blocks, the spool base blocks flow connected to lubricant users, comprising:

a valve base block mounted to an adjacent spool base block, said valve base block having an inlet for receiving lubricant and an outlet connected to said adjacent spool base block, and a first channel between said inlet and a first opening at a face of said valve base block, and a second channel between said outlet and a second opening at said face of said valve base block;

a valve block mounted onto said valve base block having a valve inlet connected to said first opening of said valve base block and a valve outlet connected to said second opening of said valve base block, and a flow path between said valve inlet and outlet; and a valve cartridge having a valve element and a valve seat arranged to interfit into said flow path to close said flow path at said valve seat, said valve cartridge insertable into a bore of said valve block.

7. The shut off valve for a progressive distributor valve according to claim 6, wherein said cartridge is removable from said valve block through a screwed connection at a top of said valve block.

8. The shut off valve for a progressive distributor valve according to claim 6, wherein said spool base blocks and said valve base block are bolted together and said valve block and said valve base block are bolted together.

9. The shut off valve for a progressive distributor valve according to claim 8, wherein said valve block and said valve base block have flush surfaces and said valve inlet and said first opening are O-ring sealed when said flush surfaces are bolted together, and said valve outlet and said second opening are O-ring sealed when said flush surfaces are bolted together.

10. The shut off valve for a progressive distributor valve according to claim 6, wherein said valve base block has outside dimensions equal to one of said spool base blocks.

11. A shut off valve for a progressive distributor valve including a plurality of spool block each of which is mounted on a spool base block, the spool blocks having reciprocating spools therein for distributing lube oil into respective spool base blocks, the spool base blocks flow connected to lubricant users, comprising:

a valve base block mounted to an adjacent spool base block, said valve base block having an inlet for receiving lubricant and an outlet connected to said adjacent spool base block, and a first channel between said inlet and a first opening at a face of said valve base block, and a second channel between said outlet and a second opening at said face of said valve base block;

a valve block mounted onto said valve base block having a valve inlet connected to said first opening of said valve base block and a valve outlet connected to said second opening of said valve base block, and a flow path between said valve inlet and outlet including a valve seat;

a valve element arranged to interfit into said flow path to close said flow path at said valve seat; and said valve base block sized having equal outside dimensions to one of said spool base blocks.

12. The shut off valve according to claim 11, wherein said valve block is bolted to said valve base block and said valve base block is bolted to said adjacent spool base block.

13. The shut off valve according to claim 12, wherein said valve base block and said valve block have flush flat surfaces, and further comprising means for sealing said connection between said valve inlet and said first opening and said valve outlet and said second opening when said flush surfaces are bolted together.

* * * * *